United States Patent [19]

Schroeder

[11] Patent Number: 5,687,954

[45] Date of Patent: Nov. 18, 1997

[54] FLEXIBLE CONDUIT INSTALLATION GUIDE APPARATUS

[76] Inventor: Brad Schroeder, 101 W. Avenida de los Arboles, #101, Thousand Oaks, Calif. 91360

[21] Appl. No.: 633,895

[22] Filed: Apr. 17, 1996

[51] Int. Cl.⁶ .................................................. H02G 1/08
[52] U.S. Cl. ..................... 254/134.3 FT; 254/134.3 SC; 254/134.3 R
[58] Field of Search .................. 254/134.3 R, 134.3 FT, 254/134.4, 134.3 SC, 134.5

[56] References Cited

U.S. PATENT DOCUMENTS

| | | | |
|---|---|---|---|
| D. 202,107 | 8/1965 | Moldt, Jr. ........................ | 254/134.3 R |
| 3,567,268 | 3/1971 | Peterson ........................ | 254/134.3 FT |
| 3,675,898 | 7/1972 | Fattor et al. ................... | 254/134.3 FT |
| 4,659,126 | 4/1987 | Breck et al. ................... | 254/134.3 PT |
| 4,684,161 | 8/1987 | Egner et al. ................... | 254/134.3 FT |
| 5,067,843 | 11/1991 | Nova . | |

Primary Examiner—Timothy V. Eley
Assistant Examiner—Lee Wilson

Attorney, Agent, or Firm—Rothwell, Figg, Ernst & Kurz

[57] ABSTRACT

A tool and method of using same for allowing one person to transport and secure a flexible conduit with mating connector in a normal utility box. The tool has a hollow body in which is placed a substantially u-shaped spring having two depending legs, each leg terminating in a hooked end. The tool is sized to have its lower portion fit within the center bore of a mating connector of the type normally used with flexible conduit. Once the tool is positioned in the connector the spring is biased to grasp the end of the connector with each hooked end of each leg of the spring. Once the connector is grasped the tool may be locked into place by screwing a securing nut over threads on the upper portion of the until the nut firmly locks the tool to the connector. Then a rope may be tied to a rope securing member positioned at the upper end of the tool for pulling the tool and attached conduit to a desired utility box. Once the conduit and its connector are pulled into the box, a normal sized connector nut may be slid into place over the rope and tool to secure the flexible conduit in place in the utility box. The spring hook ends may be released by pressing push pins located on the upper body of the tool.

12 Claims, 2 Drawing Sheets

5,687,954

FLEXIBLE CONDUIT INSTALLATION GUIDE APPARATUS

BACKGROUND OF THE INVENTION

1. Field of the Invention

This invention relates generally to flexible conduits for electrical or communications wiring, and more particularly to a tool for installing and securing flexible conduit in an outlet box.

2. Description of the Related Art

If an electrical contractor wishes to create a new electrical convenience outlet or a light fixture, he must complete a pathway with flexible conduit to pass wires through from an existing outlet to the location of a new one. The passageway is usually created in the form of known flexible conduit. However, this is problematic because the flexible conduit must be extended between an existing utility box to a new location through a passage in a wall cavity. The cavity is sealed between wallboards on either side and wall studs located between the wallboards. Further the conduit must be secured at the mouth of a small opening in the existing box. The job typically requires two people, because of limited sight and access, and precise alignment requirements. It is inconvenient and expensive to require two people for this task. To avoid high costs, individuals need a way to complete electrical renovation without requiring the help of others.

One proposed solution for moving flexible conduit from one location to another is proposed by Wallace B. Nova in U.S. Pat. No. 5,067,843. The Nova patent discloses a pulling attachment that screws directly into flexible conduit and has a fastening fixture for receiving a metal fish-tape. Fish-tape is a thin substrate of metal that is attached to wire and is a known way of pulling wire. The Nova-disclosed tool is described as being particularly useful for "snaking" a fish-tape with conduit attached through serpentine pathways.

Using such a tool for moving conduit from a utility box to a new location would present several problems. First of all, metal fish-tape is forbidden by modern electrical safety rules in structures already wired and electrically connected. This is because the metal tape may cause an electrical short circuit. Thus, the Nova-disclosed tool is apparently intended for new construction as opposed to renovation. Another disadvantage of the Nova-disclosed tool for remodeling jobs is that the tool be unscrewed when the pulling is complete. This is time consuming and offers no way of securing the conduit to a utility box.

A tool for pulling duct containing wire is disclosed by Steven E. Breck in U.S. Pat. No. 4,659,126. The Breck-disclosed tool appears useful for pulling electrical duct of varying cross-sectional dimensions. However, the tool has similar disadvantages to the Nova-disclosed tool when it comes to extending flexible conduit between an existing utility box and a new location the tool. The disadvantages are similar because the Nova-tool is designed for assisting in arranging underground telephone cable. Another device for drawing wire through conduit is disclosed by Fatter et al in U.S. Pat. No. 3,675,898. That device also requires the use of metal fish-tape and requires clamping of the wires making it extremely disadvantageous for existing construction.

What is needed is a tool that allows one person to quickly extend a flexible conduit with an attached prior art connector in one easy step between an existing utility box and desired location of another. Once the conduit is in place, it would be particularly advantageous to be able to release the tool with the push of a button and simply screw the flexible conduit in place with the known prior art conduit connector.

SUMMARY OF THE INVENTION

To solve the problems described above and in view of others that will become clearer upon reading the detailed description below, the inventor has provided a tool that easily fits into the center bore of an ordinary flex conduit connector and includes a spring with hooked ends for securing it at the connector end. Preferably the connector is attached to ordinary flex conduit prior to engaging the springs of the tool. The tool further includes a tapered nut that screws onto threads on the exterior of the tool and assures a snug fit into the center bore of the connector. A rope tie securing member on the end of the tool allows it to be pulled through a wall cavity into the opening in an ordinary utility box. Once the tool is pulled through the opening of the utility box then an ordinary prior art nut supplied with the ordinary connector may be used to screw to and secure the conduit.

An enhanced alternative for the tool includes means for releasing the tool. The means are preferably configured as push pins disposed on the upper part of the tool for compressing the spring and releasing the hooked ends from the end of the connector.

BRIEF DESCRIPTION OF THE DRAWING

Other objects and advantages of this invention will become more apparent from the detailed description below when read in view of the accompanying drawing in which.

DETAILED DESCRIPTION OF THE PREFERRED EMBODIMENT

Figure 1:
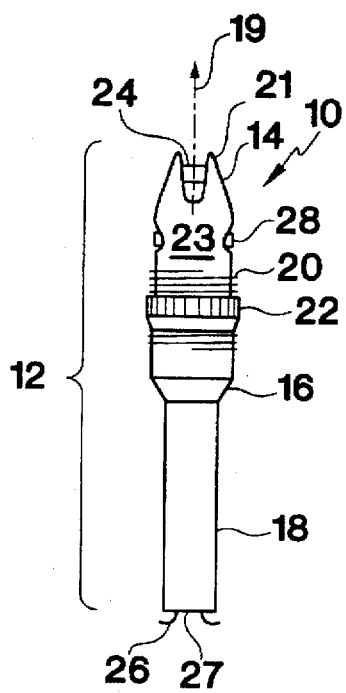
FIG. 1 is a front view of an embodiment of this invention as a tool for guiding and installing flexible conduit between a utility box (FIG. 4) and a location of a new utility box.

Reference is now made to the drawing in which like numbers throughout the various figures represent the same or similar elements.

FIG. 1 shows an apparatus 10 for allowing one person to transport and secure a flexible conduit (FIG. 2, discussed below) to a utility box (FIG. 4, discussed below) having at least one flexible conduit receiving opening. This invention is particularly useful for transporting conduit from a new desired location for a utility box to one that is already in place, e.g. would be the case in a remodeling operation. In view of the teachings below, it may occur to one skilled in the art that this invention may be adapted for use in new construction. However, the invention is described primarily with reference to renovations or other type of remodeling jobs because this is a significant problem for which the invention provides a solution.

Figure 2:
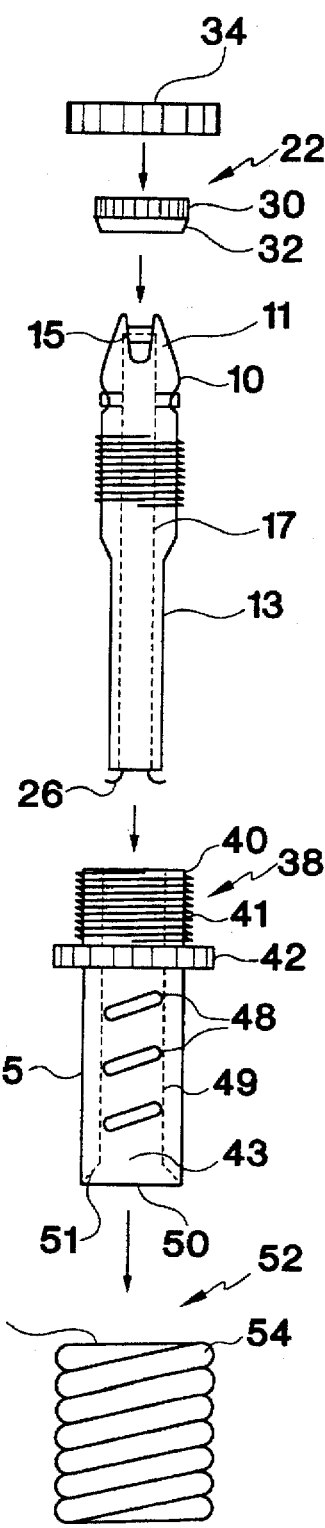
FIG. 2 is an exploded view of the guide tool of FIG. 1 in a relationship with an ordinary connector, ordinary connector securing nut, and ordinary flexible conduit.

FIG. 2 shows an exploded view of the apparatus to show its relationship with ordinary connector 38 and ordinary flexible conduit 52. Connector 38 and conduit 52 are known and can be purchased in a typical hardware store. An ordinary connector securing nut 34 which is threaded to mate with male-threads 41 of the upper shank 40 of the connector is also known and typically provided with the connector 38.

Referring once again to FIG. 1 and also with reference to FIG. 2, the apparatus 10 has an elongated body 12 disposed symmetrically about longitudinal axis 19, a upper portion 14, lower portion 18, and a middle tapered portion 16. Preferably body 12 includes an exterior shell 23 that is constructed of high-strength plastic. The apparatus includes a male-threaded region 20, onto which fits a mating threaded nut 22 having a threaded portion 30 (threads not shown) and a lower tapered unthreaded portion 32 that is sized to allow a snug fit into center bore 43 of the connector. Preferably the nut 22 is also made of high strength plastic.

Apparatus 10 further includes a rope securing member 24, which may be configured simply as a bar, near a first or upper end 21 of upper portion 14. Member 24 allows the attachment of a pulling thread such as a nylon rope to the tool to allow transporting of the connector and flex conduit so that it can be extended between a desired location of a new utility box and an existing box (e.g. as the box 60 shown in FIG. 4). The apparatus includes a hollow cavity 11, in which a substantially u-shaped spring 13 is placed. The spring includes a base 15 and two depending legs 17. Each leg terminates in a hooked end 26 at a second or lower end 27 of the apparatus. Each hook is configured to grasp connector 38 through an opening at lower end 50 of the connector over slightly beveled region 51. Beveled region 51 is shown at an exaggerated angle with inner wall 49 to reflect the typical geometry of such connectors. It is preferred that this geometry be matched by angling hooked end 26 to parallel and approximately coincide with the curvature of bevel 51. In this way an optimum secure fit may be achieved.

The relationship between connector 38 and flex conduit 52 is well known since these elements are part of the prior art but the inventor has invented a new way to take advantage of it. Referring again to FIG. 2, the connector 38 has a center bore 43 and is principally divided into a male-threaded shank 40 proximate a first or upper end thereof, an annular shoulder 42, and lower neck 45, to a second or lower end 50. The male-threads 41 mate with inner threads (not shown) of connector securing nut 34 to allow final securing of the connector with attached conduit 52 once the conduit is extended between a desired location and an existing box. The lower neck 45 includes a portion of the center bore and defines its shape in this lower region within the boundaries of inner wall 49 and bevel 51. Neck 45 terminates the connector at open-end 50. The connector neck 45 fits into the opening 56 of the coil. The exterior of the neck includes raised ribs or male-threads 48 which are designed to mate with the interior of helical coils 54 of flex conduit 52 when the connector is placed in opening 56. The annular shoulder 42 serves as a stop to prevent nut 34 from damaging the conduit and also as a washer surface that absorbs pressure from nut 34 when it is screwed onto threads 41.

In a preferred embodiment, the hooked ends 26 closely follow the curved surface 51 over the edge of open end 50 to grasp the connector in its mated relationship with conduit 52. The operator simply inserts the tool body 12 into center bore 43 and the spring's legs 17 automatically grasp the connector with ends 26 at points 51 over end 50.

Figure 3:
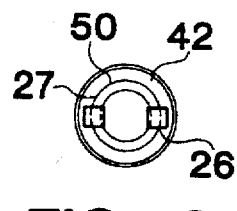
FIG. 3 is an end view of the connector of FIG. 2 in an engaging relationship with the tool of FIG. 1.

FIG. 3 shows the relationship of hooked ends 26 protruding over open end 50 of connector 38. The end 27 of the tool 10 can also be seen in this view as well as annular shoulder 42 of connector 38.

Figure 4:
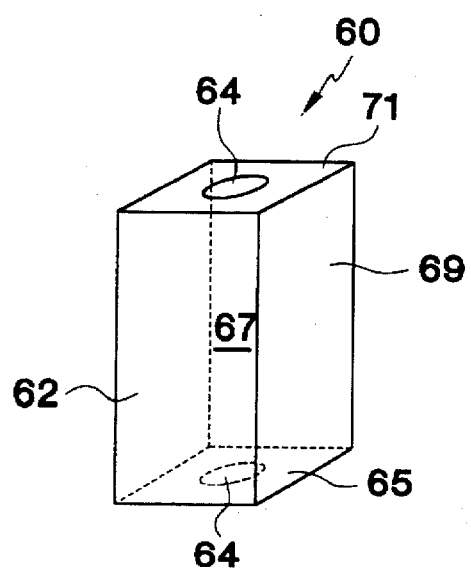
FIG. 4 is an perspective view of an ordinary utility box of the type with which this invention is useful.

FIG. 4 shows a typical prior art utility box 60 which the invention is particularly useful with. The utility box is substantially a rectangular box having an open rectangular-shaped face 62, a closed back side 67, and closed parallel sides 69. Bottom 65 and top 71 typically include punch-out apertures 64 for allowing access of flex conduit 52 (FIG. 2) to the box. In a typical remodeling job, an electrical contractor will need to extend conduit 52 between a new location for a box and an existing box 60. Because the conduit needs to be moved from one location to another between wall studs, access is limited. Further the conduit must typically enter the existing box through a relatively small opening, such as opening 64. The alignment must be fairly precise so that the conduit may be secured in place to meet electrical safety code requirements.

In the past, without the benefit of the present invention, this task has necessarily required at least two people. Without this invention, one person must attempt to pass the conduit from the new location to the existing box while the other person tries to fit it through the opening in the existing box (such as the hole 64 shown in FIG. 4). This is complex, laborious, and time-consuming. If a second person is not available, the job has to be postponed until one is available. The present invention eliminates this onerous burden.

Figure 5:
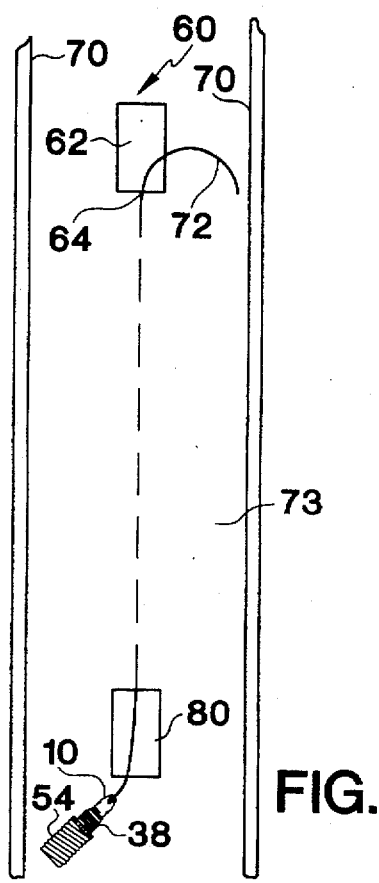
FIG. 5 is a simplified view of the tool and connector coupled in the engaging relationship shown in FIG. 3 and further coupled to a flexible conduit that needs to be extended between a utility box of the type shown in FIG. 4 and a location for a new utility box, also of the type shown in FIG. 4.

FIG. 5 shows a simplified illustration of a typical task, such as the one described above. Flex conduit 54 must be extended from a wall opening 80 cut-out for a new utility box to existing box 60 which is electrically connected. The operator simply needs to tie string 72 to rope tie bar 24 (FIG. 1) of tool 10, reach into opening 62 on the box and drop the tied combination through hole 64 of box 60 into wall cavity 73 between wall studs 70. Without much difficulty it is easy to drop the tool 10 into opening 80. The operator places ordinary connector 38 in a length of ordinary flex conduit 52 sufficiently long to span the required extension distance and then places tool 10 through the center bore of the connector.

When the spring's hooked ends 26 grasp the end 50, and nut 22 is tightened onto threads 20, then the tool 10 and the grasped connector 38 with coupled flex conduit 54 are ready for transporting to the final destination box 60. Preferably the springs are made of hardened steel for strength and flexibility. An audible "click" should alert the operator that the steel springs are in place and ready for the job.

Figure 6:
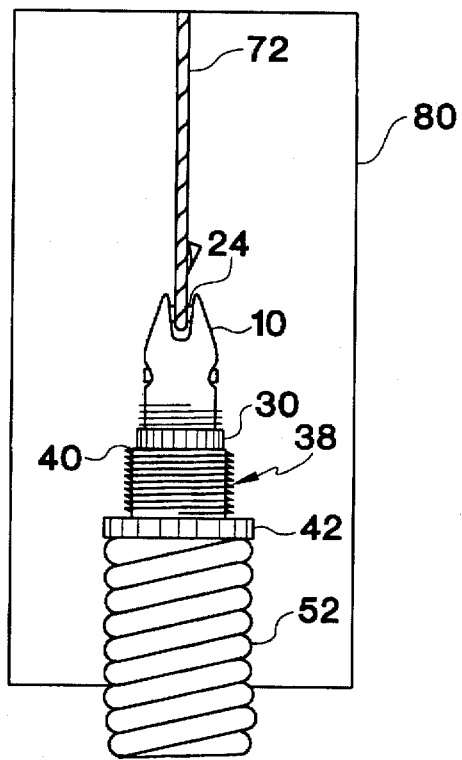
FIG. 6 is a simplified front view of the connector and tool, showing the flexible conduit being transported from the location for the new utility box to the existing utility box (not shown in FIG. 6)

FIG. 6 is an enlarged view for the sake of clarity showing the tool 10 connected to coupled connector 38 and flex conduit 52 and ready for transportation from wall opening 80 to box 60. The tool is securely tied to rope 72 at bar 24 and the connector is extending into the throat (not shown) of the conduit to annular shoulder 42. Threads 20 are distributed over shell 23 sufficiently to allow nut 22 to be screwed down to a position where tapered portion 32 provides a very snug fit in the opening leading to center bore 43 of the connector. The tool firmly grasps the connector with the hooked ends of the springs (not shown in FIG. 6) as described above. Now the tool with the attached payload of connector and conduit is ready for transporting to box 60.

Figure 7:
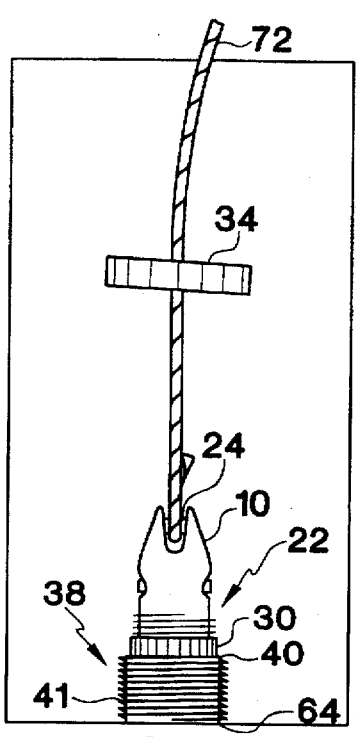
FIG. 7 shows the tool in place through the opening in the existing utility box and the connector nut in place for securing the connector with attached flexible conduit in the utility box.
Figure 8:
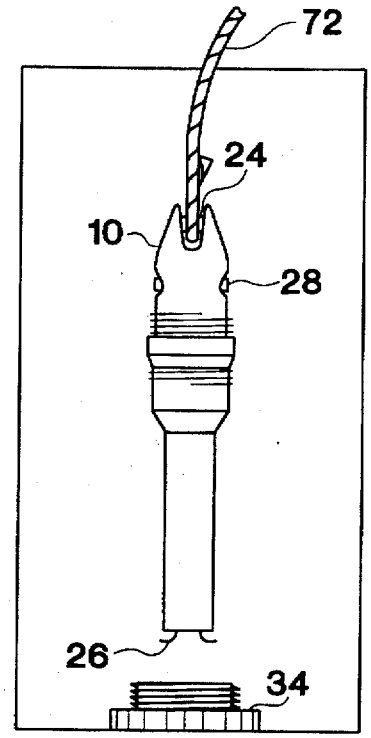
FIG. 8 shows the connector nut and connector securely coupled to the utility box of FIG. 7 while the tool is being disengaged for further use with other flexible conduits.

FIGS. 7, and 8, show the sequence of operation of securing the connector and conduit in utility box 60 and removing tool 10 for use again in another operation. The threads 41 are now ready to receive connector securing nut 34, which is slid over rope 72 and tool 10. FIG. 7 shows that the conduit is pulled into box 60, to allow screwing of nut 34 onto the threads 41 until a stop at annular shoulder 42 is reached. FIG. 8 shows the conduit connected to box 60 with nut 34 screwed down and securing the connector in place. Now, the box is effectively clamped between the nut and annular shoulder (not shown in FIG. 8). Once the connector and conduit are secured to the box, the operator simply turns nut 22 backwards one turn to relieve some pressure and compresses push pins 28 which compresses the spring and releases hook ends 26. Now the tool is ready to be used repeatedly for similar tasks.

An apparatus for transporting and securing flexible conduit and a method of using and making the same have been described above. Alternative embodiments may occur to this skilled in the art in view of these teachings. Therefore it should be understood that this invention is not to be limited by the description of preferred embodiments above. The invention is only to be limited by the claims below which define the invention's breadth and scope and are intended to cover its equivalents as well.

What is claimed is:

1. An apparatus for allowing one person to use a pulling rope to transport and then secure a flexible conduit to a utility box having at least one flexible conduit receiving opening, wherein the flexible conduit is threadingly mated to a flexible conduit connector having a first end and a second end and a center bore, the connector including a male-threaded shank proximately located to the first end, a male-threaded neck for coupling to the flexible conduit and being disposed near the second end, a securing nut adapted to threadingly mate with the male-threaded shank, the apparatus comprising:

an elongated body having a longitudinal axis, a first end and a second end, an exterior shell, and a substantially hollow cavity within the shell;

a substantially u-shaped spring disposed in the hollow cavity, the spring having a base portion near the first end of the body and two depending leg members, each leg member having a hooked end located proximate the second end of the body for hooking the second end of the flexible conduit connector; and a rope securing member disposed near the first end of the body for coupling to a pulling rope for transporting the apparatus when coupled to the flex conduit connector.

2. The apparatus of claim 1, further comprising spring compressors located on the exterior shell that are extendable into the cavity for pushing on each spring leg thereby causing each hooked end of each leg to release the second end of the flex conduit connector when the connector is secured in a utility box.

3. The apparatus of claim 1, further comprising a threaded portion disposed on the outer shell and a mating nut having a threaded portion of a first diameter and a tapered neck that is slightly narrower at its widest part than the first diameter and is sized to allow the tapered neck to fit snugly through an opening of the connector until the tapered neck rests at least partially in the center bore while the threaded portion resides above the opening.

4. The apparatus of claim 3, wherein the body has a first upper portion near the first end of the body having a first width slightly smaller than the first diameter of the mating nut and a second lower portion having a second width that is smaller than the first width.

5. The apparatus of claim 3, wherein the body has a first upper portion near the first end of the body having a first width slightly smaller than the first diameter of the mating nut and a second lower portion having a second width that is smaller than the first width.

6. The apparatus of claim 5, wherein the width of the upper portion is slightly smaller than the diameter of the connector securing nut so that the securing nut may be placed over the exposed portion of the apparatus for threading to the male-threaded shank, thereby securing the flex conduit in place in the utility box.

7. The apparatus of claim 5, further comprising spring compressors on the upper portion of the exterior shell that are extendable into the cavity for pushing on each spring leg for causing each hooked end of each leg to release the second end of the flex conduit connector.

8. The apparatus of claim 7, wherein the spring compressors include two separate push pins, one separate push pin for each spring leg, mounted on the upper portion of the apparatus body between the threaded region and the first end.

9. An apparatus for allowing one person to use a pulling rope to transport and then secure a flexible conduit to a utility box having at least one flexible conduit receiving opening, wherein the flexible conduit is threadingly mated to a flexible conduit connector having a first end and a second end and a center bore, the connector including a male-threaded shank proximately located to the first end, a male-threaded neck for coupling to the flexible conduit and being disposed near the second end, a securing nut adapted to threadingly mate with the male-threaded shank, the apparatus comprising:

an elongated body having a longitudinal axis, a first end and a second end, an exterior shell, and a substantially hollow cavity within the shell;

a substantially u-shaped spring disposed in the hollow cavity, the spring having a base portion near the first end of the body and two depending leg members, each leg member having a hooked end located proximate the second end of the body for hooking the second end of the flexible conduit connector;

a rope securing member disposed near the first end of the body for coupling to a pulling rope for transporting the apparatus when coupled to the flex conduit connector; and spring compressors located on the exterior shell that are extendable into the cavity for pushing on each spring leg thereby causing each hooked end of each leg to release the second end of the flex conduit connector when the connector is secured in a utility box.

10. The apparatus of claim 9, further comprising a threaded portion disposed on the outer shell and a mating nut having a threaded portion of a first diameter and a tapered neck that is slightly narrower at its widest part than the first diameter and is sized to allow the tapered neck to fit snugly through an opening of the connector until the tapered neck rests at least partially in the center bore while the threaded portion resides above the opening.

11. An apparatus for allowing one person to use a pulling rope to transport and then secure a flexible conduit to a utility box having at least one flexible conduit receiving opening, wherein the flexible conduit is threadingly mated to a flexible conduit connector having a first end and a second end and a center bore, the connector including a male-threaded shank proximately located to the first end, a male-threaded neck for coupling to the flexible conduit and being disposed near the second end, and a securing nut adapted to threadingly mate with the male-threaded shank, the apparatus comprising:

an elongated body having a longitudinal axis extending from a first end to a second end of the elongated body;

a hook movably mounted to said elongated body proximate the second end of the elongated body, said hook being movable to a position wherein the hook extends outward from the elongated body and being movable to another position wherein the hook is moved towards the center of the longitudinal axis of the elongated body to enable the hook to releaseably hook the second end of the flexible conduit connector; and a rope securing member disposed near the first end of the body for coupling to a pulling rope for transporting the apparatus when coupled to the flexible conduit connector.

12. The apparatus of claim 11, wherein said hook is formed on a spring which biases said hook to said position wherein said hook extends outward.

* * * * *